(12) United States Patent
Sata (10) Patent No.: US 10,787,174 B2
(45) Date of Patent: Sep. 29, 2020

(54) AUTOMATIC VEHICLE DRIVING MODE SYSTEM

(71) Applicant: Toyota Motor Engineering & Manufacturing North America, Inc., Erlanger, KY (US)

(72) Inventor: Andrew G. Sata, Irvine, CA (US)

(73) Assignee: TOYOTA MOTOR ENGINEERING & MANUFACUTRING NORTH AMERICA, INC., Plano, TX (US)

( * ) Notice: Subject to any disclaimer, the term of this patent is extended or adjusted under 35 U.S.C. 154(b) by 337 days.

(21) Appl. No.: 15/783,980

(22) Filed: Oct. 13, 2017

(65) Prior Publication Data

US 2019/0111925 A1    Apr. 18, 2019

(51) Int. Cl.
*B60W 30/182* (2020.01)
*B60W 10/10* (2012.01)
*B60W 10/22* (2006.01)
*B60W 10/30* (2006.01)
(Continued)

(52) U.S. Cl.
CPC .......... *B60W 30/182* (2013.01); *B60W 10/10* (2013.01); *B60W 10/22* (2013.01); *B60W 10/30* (2013.01); *B60W 30/02* (2013.01); *B60W 50/082* (2013.01); *B60W 2530/14* (2013.01); *B60W 2540/215* (2020.02); *B60W 2552/05* (2020.02); *B60W 2555/60* (2020.02); *B60W 2556/60* (2020.02); *B60W 2710/10* (2013.01);
(Continued)

(58) Field of Classification Search
CPC ...... B60W 40/09; B60W 50/00; B60W 10/10; B60W 13/30; B60W 30/182; B60W 2540/30; B60W 2050/0095; B60W 2530/14; B60W 2540/215; B60W 2554/00; B60L 5/20; B60L 2250/18
See application file for complete search history.

(56) References Cited

U.S. PATENT DOCUMENTS

| 5,410,476 A | 4/1995 | Iizuka |
| 6,474,186 B1 * | 11/2002 | Vollmar .............. F16H 59/0204  74/335 |
| 7,122,979 B2 | 10/2006 | Wilton et al. |

(Continued)

FOREIGN PATENT DOCUMENTS

GB    2493908    2/2013

*Primary Examiner* — Mussa A Shaawat
(74) *Attorney, Agent, or Firm* — Snell & Wilmer LLP (57) ABSTRACT

Methods, systems, and apparatus for automatically determining and implementing a driving mode from a plurality of driving modes of a vehicle. The system includes a GPS unit configured to detect a geographical location of the vehicle. The system includes a memory configured to store a driving mode map identifying an initial driving mode based on a given geographical location. The system includes an input unit configured to receive a driving mode sensitivity indicating a desired level of driving aggressiveness. The system includes an electronic control unit (ECU). The ECU is configured to determine the driving mode based on the driving mode map, the detected geographical location of the vehicle, and the driving mode sensitivity. The ECU is configured to automatically adjust operation of the vehicle based on the adjusted driving mode by adjusting a suspension, throttle sensitivity, shift points, air conditioning usage, traction control, or stability control.

17 Claims, 5 Drawing Sheets

(51) Int. Cl.
*B60W 30/02* (2012.01)
*B60W 50/08* (2020.01)

(52) U.S. Cl.
CPC ..... *B60W 2710/22* (2013.01); *B60W 2710/30* (2013.01)

(56) References Cited

U.S. PATENT DOCUMENTS

| | | | |
|---|---|---|---|
| 7,255,946 B2 | 8/2007 | Nakaji et al. | |
| 7,853,391 B2 | 12/2010 | Komeda et al. | |
| 8,463,522 B2 | 6/2013 | Tomokuni et al. | |
| 8,615,342 B2 | 12/2013 | Suganuma et al. | |
| 9,045,139 B2 | 6/2015 | Chen et al. | |
| 9,242,637 B2 | 1/2016 | Miyamoto et al. | |
| 9,442,484 B2 | 9/2016 | Park | |
| 9,550,497 B2 | 1/2017 | Jeon | |
| 2004/0014564 A1* | 1/2004 | Jager | B60W 10/11 477/115 |
| 2004/0064229 A1* | 4/2004 | Stout | B62D 6/02 701/44 |
| 2004/0077457 A1* | 4/2004 | Serebrennikov | F16H 3/38 477/34 |
| 2004/0088093 A1* | 5/2004 | Yao | B62D 6/008 701/44 |
| 2005/0090963 A1* | 4/2005 | Kuhn | B60N 2/0244 701/56 |
| 2007/0105690 A1* | 5/2007 | Steinhauser | F16H 61/0437 477/115 |
| 2007/0106465 A1* | 5/2007 | Adam | G08G 1/00 701/533 |
| 2009/0099727 A1* | 4/2009 | Ghoneim | B60W 50/085 701/36 |
| 2012/0203426 A1* | 8/2012 | Held | B60W 40/09 701/36 |
| 2014/0025259 A1* | 1/2014 | Szwabowski | B60W 50/00 701/36 |
| 2015/0006064 A1* | 1/2015 | Dextreit | F02D 35/00 701/112 |
| 2015/0047495 A1* | 2/2015 | Neitzke | B60W 40/09 84/609 |
| 2015/0073658 A1* | 3/2015 | Stoof | B60G 17/016 701/37 |
| 2015/0217755 A1 | 8/2015 | Bryan et al. | |
| 2015/0224989 A1* | 8/2015 | Fairgrieve | B60W 30/02 701/37 |
| 2016/0031444 A1 | 2/2016 | Fairgrieve et al. | |
| 2016/0363213 A1* | 12/2016 | Adames | F16H 61/0213 |
| 2016/0371641 A1* | 12/2016 | Wilson | G06Q 10/0832 |
| 2017/0009694 A1 | 1/2017 | Deshmukh et al. | |
| 2017/0080948 A1* | 3/2017 | Lubbers | B60W 40/09 |
| 2017/0088140 A1* | 3/2017 | Barone | B60W 30/19 |
| 2017/0123423 A1 | 5/2017 | Sako et al. | |
| 2017/0365165 A1* | 12/2017 | Landfors | G06F 16/182 |
| 2017/0369052 A1* | 12/2017 | Nagy | B60W 50/14 |
| 2018/0023692 A1* | 1/2018 | Gauthier | F16H 61/0213 701/55 |
| 2019/0100204 A1* | 4/2019 | Plianos | B60W 30/188 |

* cited by examiner

| TRAFFIC DATA | TOPOGRAPHICAL DATA | SPEED LIMIT DATA | ROAD TYPE DATA | DRIVING MODE |
|---|---|---|---|---|
| CLEAR | FLAT/STRAIGHT | 65 | FREEWAY | COMFORT |
| CONGESTED | FLAT/STRAIGHT | 65 | FREEWAY | NORMAL |
| CLEAR | INCLINED/STRAIGHT | -- | FREEWAY ON-RAMP | SPORT |
| CLEAR | FLAT/CURVED | 25 | SURFACE STREET | SPORT |
| CLEAR | ROUGH/STRAIGHT | 45 | SURFACE STREET | COMFORT |
| CLEAR | FLAT | -- | RACETRACK | TRACK |

AUTOMATIC VEHICLE DRIVING MODE SYSTEM

BACKGROUND

1. Field

This specification relates to a system and a method for automatically determining and implementing a driving mode for a vehicle.

2. Description of the Related Art

A vehicle may have a normal, default setting used in operation, where various operational settings of the vehicle are defined by the manufacturer. These settings may include a suspension tightness or a throttle sensitivity. Sports cars meant for high performance may have a tighter suspension and may be more responsive to engaging of the accelerator pedal, and family cars meant for comfort may have a softer suspension and may accelerate at a lower rate. Some vehicles may offer a "sport mode" which, when engaged, adjusts one or more aspects of the vehicle operational settings to provide a "sportier" experience for the driver. However, manually switching between sport mode and other modes may be distracting to the driver, and driver knowledge of the various effects of different driving modes cannot be assumed.

SUMMARY

What is described is a system for automatically determining and implementing a driving mode from a plurality of driving modes of a vehicle. The system includes a GPS unit configured to detect a geographical location of the vehicle. The system also includes a memory configured to store a driving mode map identifying an initial driving mode based on a given geographical location. The system also includes an input unit configured to receive, from a user, a driving mode sensitivity indicating a desired level of driving aggressiveness. The system also includes an electronic control unit (ECU). The ECU is configured to determine the initial driving mode based on the driving mode map and the detected geographical location of the vehicle. The ECU is also configured to determine an adjusted driving mode by adjusting the initial driving mode based on the driving mode sensitivity. The ECU is also configured to automatically adjust operation of the vehicle based on the adjusted driving mode by adjusting at least one of a suspension, a throttle sensitivity, shift points, an air conditioning usage, a traction control, and/or a stability control.

Also described is a vehicle automatically determining and implementing a driving mode from a plurality of driving modes. The vehicle includes a GPS unit configured to detect a current geographical location. The vehicle also includes a memory configured to store a driving mode map identifying an initial driving mode based on a given geographical location. The vehicle also includes an input unit configured to receive, from a user, a driving mode sensitivity indicating a desired level of driving aggressiveness. The vehicle also includes an electronic control unit (ECU). The ECU is configured to determine the initial driving mode based on the driving mode map and the current geographical location. The ECU is also configured to determine an adjusted driving mode by adjusting the initial driving mode based on the driving mode sensitivity. The ECU is also configured to automatically adjust operation of the vehicle based on the adjusted driving mode by adjusting at least one of a suspension, a throttle sensitivity, shift points, an air conditioning usage, a traction control, and/or a stability control.

Also described is a method for automatically determining and implementing a driving mode from a plurality of driving modes of a vehicle. The method includes detecting, by a GPS unit, a geographical location of the vehicle. The method also includes storing, by a memory, a driving mode map identifying an initial driving mode based on a given geographical location. The method also includes receiving, by an input unit, from a user, a driving mode sensitivity indicating a desired level of driving aggressiveness. The method also includes determining, by an electronic control unit (ECU), the initial driving mode based on the driving mode map and the detected geographical location of the vehicle. The method also includes determining, by the ECU, an adjusted driving mode by adjusting the initial driving mode based on the driving mode sensitivity. The method also includes automatically adjusting, by the ECU, operation of the vehicle based on the adjusted driving mode by adjusting at least one of a suspension, a throttle sensitivity, shift points, an air conditioning usage, a traction control, and/or a stability control.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for automatically determining and implementing a driving mode for a vehicle. Some vehicles may have a sport mode or an economy mode which, when engaged, adjust one or more operational settings of the vehicle. For example, when a sport mode is engaged, a suspension may become tighter than a normal, default setting. However, the changing from a normal, default mode to a sport mode or an economy mode is determined by the driver and manually changed by the driver. In many situations, the driver may not desire a particular mode to be employed all of the time, and having the driver engage and disengage the particular mode on an ad-hoc basis may be distracting for the driver. In addition, the driver may not be aware of the various operational adjustments made by the various modes, so manual adjustment may result in the vehicle being operated in a sub-optimal driving mode. Operation in a sub-optimal driving mode may result in loss of operational efficiency or reduced feel or reduced comfort.

The systems, vehicles, and methods disclosed herein describe automatically setting a driving mode based on the location of the vehicle, the driver's sensitivity preferences, and/or the driver's driving history. In this way, a complete and personalized driving mode is automatically provided for the driver. Using an automatically determined driving mode may increase the driver's experience, as the vehicle may adjust its performance in anticipation of the driver's requests, and may be more fuel efficient, as a driver may be less likely to mistakenly leave the vehicle operating in a less efficient mode than is desired. Further, automatic switching of the driving mode may result in increased overall safety, as the driver may be less distracted in determining which driving mode to use, and actually engaging the proper buttons to engage the desired driving mode. In some embodiments, over time, the driver's preferred driving modes may be learned to more accurately reflect the driver's desired driving mode for a given location or type of location.

FIGS. 1A-1D illustrate exemplary scenarios for use of the automatic vehicle driving mode system, according various embodiments of the invention.

Figure 1A:
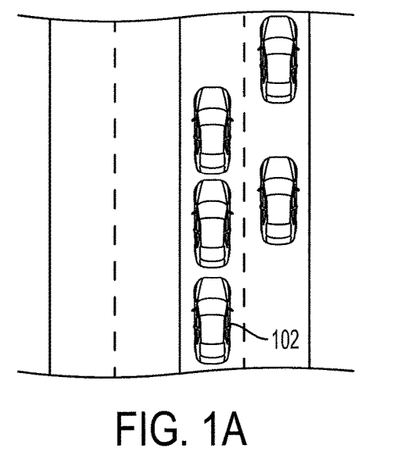
FIGS. 1A-1D illustrate exemplary scenarios for use of the automatic vehicle driving mode system, according to various embodiments of the invention.

FIG. 1A illustrates a vehicle 102 using an economy driving mode, whereby the operations of the vehicle 102 are adjusted to render the vehicle 102 more energy efficient. In some embodiments, in the economy driving mode, air conditioning usage is minimized, and in the case of a hybrid vehicle with a motor and an engine, more of the motor is used instead of the engine.

Figure 1B:
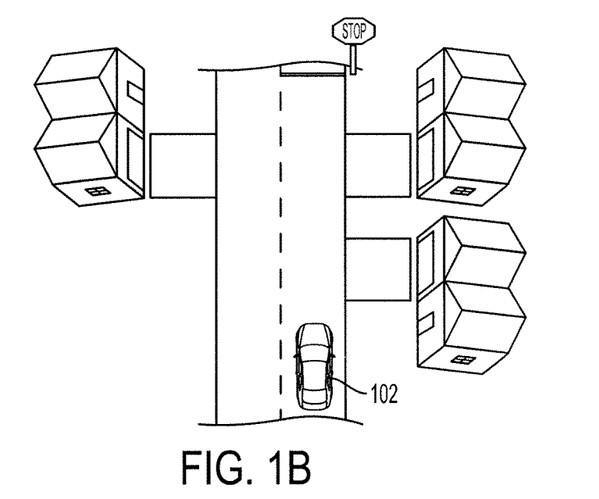

FIG. 1B illustrates a vehicle 102 using a normal driving mode, whereby the operations of the vehicle 102 are not adjusted, and the vehicle 102 is operated according to the manufacturer's default specifications. The normal driving mode may be used in a residential area, where a variety of driving conditions may be possible, such as frequent stopping, extended stretches of low speed driving, and frequent turns.

Figure 1C:
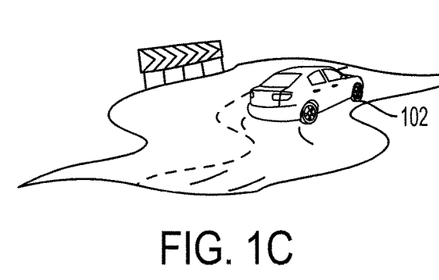

FIG. 1C illustrates a vehicle 102 using a track driving mode, whereby the operations of the vehicle 102 are adjusted for extreme performance. In some embodiments, in the track mode, the suspension of the vehicle 102 is tightened, the throttle sensitivity is increased, shift points are adjusted to hold gears for a longer period of time, the point at which traction control is engaged is increased to make traction control engagement less likely, or traction control is disabled entirely, and the point at which stability control is engaged is increased to make stability control engagement less likely, or stability control is disabled entirely. In some embodiments, when traction control and/or stability control is disabled, a notification may appear on the display asking the driver for permission or consent to disable these features. If vehicle 102 is capable of all-wheel drive, it may be enabled in track driving mode.

Figure 1D:
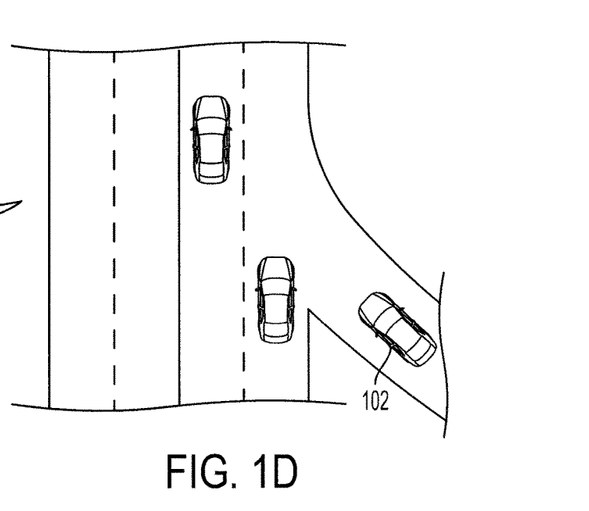

FIG. 1D illustrates a vehicle 102 using a sport driving mode, whereby the operations of the vehicle 102 are adjusted for increased performance. The types of adjustments may be similar to those made in track mode, but made to a lesser degree. In some embodiments, in sport mode, the suspension of the vehicle 102 is tightened, the throttle sensitivity is increased, shift points are adjusted to hold gears for a longer period of time, the point at which traction control is engaged is increased to make traction control engagement less likely, and the point at which stability control is engaged is increased to make stability control engagement less likely. As shown in FIG. 1D, the vehicle 102 is on a freeway on-ramp, and the vehicle 102 may benefit from added throttle sensitivity when accelerating, and the vehicle 102 may also benefit from a tightening of suspension when traversing the curved portion of the freeway on-ramp.

The exemplary scenarios illustrated in FIGS. 1A-1D are merely illustrative and not limiting, and other situations may be possible where the driving modes of the vehicle 102 are used. For example, the economy driving mode may be used when the vehicle 102 is driving on a straight, empty road for an extended period of time.

In each of the scenarios illustrated in FIGS. 1A-1D, a particular driving mode may be used for a particular location or a particular type of location. However, switching between the modes may be distracting to the driver, or the driver may not be aware of the best mode to use. The automatic vehicle driving mode system automatically sets the driving mode based on the location of the vehicle, the preferences of the driver, and/or the driver's previous driving habits, as described herein.

Figure 2:
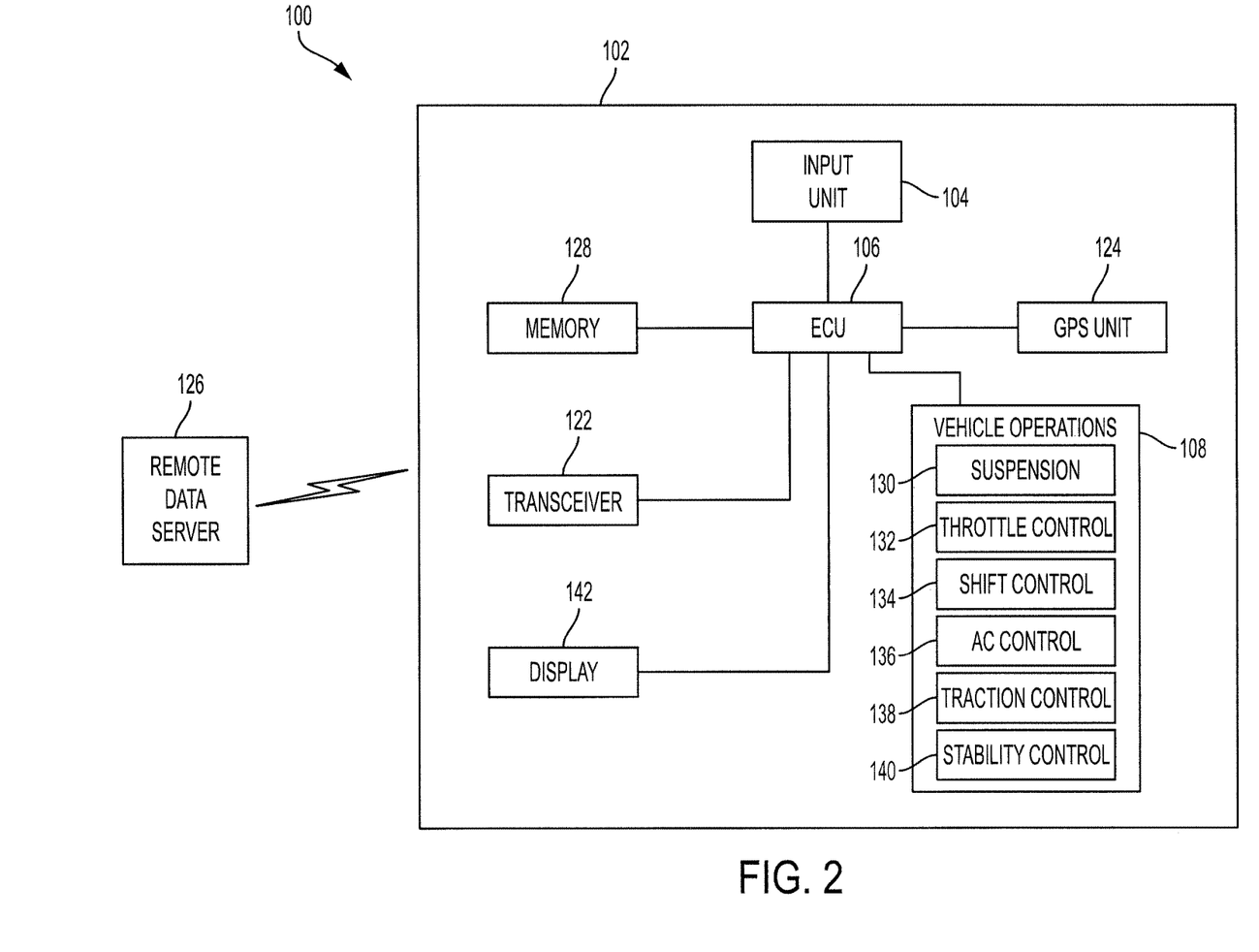
FIG. 2 illustrates an exemplary automatic vehicle driving mode system, according to various embodiments of the invention.

FIG. 2 illustrates an exemplary automatic vehicle driving mode system, according to various embodiments of the invention. The system 100 includes a vehicle 102. The vehicle 102 may be a fully electric vehicle, a partially electric vehicle, or a conventional vehicle powered by an internal combustion engine. The vehicle 102 is a conveyance capable of transporting a person, an object, or a permanently or temporarily affixed apparatus. The vehicle 102 may be a self-propelled wheeled conveyance, such as a car, sports utility vehicle, truck, bus, van or other motor or battery driven vehicle. For example, the vehicle 102 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 102 may be a semi-autonomous vehicle or an autonomous vehicle. That is, the vehicle 102 may be self-maneuvering and navigate without human input. An autonomous vehicle may use one or more sensors and/or a navigation unit to drive autonomously.

The vehicle 102 may include one or more computers or electronic control units (ECUs) 106, appropriately programmed, to control one or more operations of the vehicle 102. The one or more ECUs 106 may be implemented as a single ECU or in multiple ECUs. The ECU 106 may be electrically coupled to some or all of the components of the vehicle 102. In some embodiments, the ECU 106 is a central ECU configured to control one or more operations of the entire vehicle 102. In some embodiments, the ECU 106 is multiple ECUs located across the vehicle 102 and each configured to control one or more local operations of the vehicle 102.

The vehicle 102 may include an input unit 104. The input unit 104 may be configured to receive input from a user, such as an occupant of the vehicle 102. The input unit 104 may be a touchscreen display of an infotainment unit, a microphone, a keyboard, a camera configured to detect motions, or one or more dials and/or buttons. The input unit 104 may be used to switch between various driving modes or to navigate between menu screens of a user interface. The input unit 104 may also be used to input a driving mode sensitivity preference of the driver. The driving mode sensitivity preference may be a preference of the driver for a more aggressive or less aggressive driving mode.

The driving mode sensitivity preference may be displayed as a set of numbers (e.g., 1, 2, 3, 4, 5) with an explanation of one side being more aggressive and the other side being less aggressive (e.g., 1 is less aggressive and 5 is more aggressive) and the driver may indicate, using the input unit 104, a number corresponding to the driver's desired level of aggressiveness. The driving mode sensitivity preference may be displayed as a horizontal line with an explanation of one side being more aggressive and the other side being less aggressive (e.g., left is less aggressive and right is more aggressive) and the driver may indicate, using the input unit 104, any point on the line corresponding to the driver's desired level of aggressiveness.

The vehicle 102 may be coupled to a network. The network, such as a local area network (LAN), a wide area network (WAN), a cellular network, a digital short-range communication (DSRC), the Internet, or a combination thereof, connects the vehicle 102 to a remote data server 126. In some embodiments, the vehicle 102 may be connected to a mobile device, such as a smartphone, via a communications protocol, such as Bluetooth, and the mobile device is connected to the remote data server 126. The remote data server 126 may be one or more servers from different service providers. Each of the one or more servers may be connected to one or more databases. A service provider may provide navigational map, weather and/or traffic data to the vehicle 102.

A database is any collection of pieces of information that is organized for search and retrieval, such as by a computer or a server, and the database may be organized in tables, schemas, queries, report, or any other data structures. A database may use any number of database management systems and may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

The navigational map information includes political, roadway and construction information. The political information includes political features such as cities, states, zoning ordinances, laws and regulations, and traffic signs, such as a stop sign, or traffic signals. For example, laws and regulations may include the regulated speed on different portions of a road or noise ordinances. The roadway information includes road features such the grade of an incline of a road, a terrain type of the road, or a curvature of the road. The construction information includes construction features such as construction zones and construction hazards.

The traffic data includes one or more traffic condition features, such as traffic congested areas or accident areas. The traffic data may provide information related to the density and movement of vehicles on a roadway and/or accident locations.

The features, e.g., road features, political features, or traffic data, each have a location that may be identified by map coordinates. The map coordinates may be defined by latitude and longitude coordinates.

The transceiver 122 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The transceiver 122 may transmit data to and receive data from devices and systems not directly connected to the vehicle 102. For example, the ECU 106 may communicate with the remote data server 126. Furthermore, the transceiver 122 may access the network, to which the remote data server 126 is also connected.

The GPS unit 124 is connected to the ECU 106 and configured to determine location data. The ECU 106 may use the location data along with map data to determine a location of the vehicle 102. In other embodiments, the GPS unit 124 has access to map data and may determine the location of the vehicle 102 and provide the location of the vehicle 102 to the ECU 106.

The memory 128 is connected to the ECU 106 and may be connected to any other component of the vehicle 102. The memory 128 is configured to store any data described herein, such as map data, location data, and any data received from the remote data server 126 via the transceiver 122. The memory 128 is also configured to store the user's driving mode sensitivity preference. The memory 128 is also configured to store driving data associated with the vehicle 102 including, for example, accelerator pedal data, brake pedal data, steering wheel data, engine data, and transmission data. The driving data may additionally be associated with the location data received from the GPS unit 124. The ECU 106 may use the stored driving data and the location data to determine a particular driving mode which would be best suited for the driver based on the location of the vehicle or the type of environment.

The vehicle 102 may have a vehicle operations array 108 including multiple vehicle components each controlling one or more aspects of the vehicle 102. The vehicle operations array 108 includes a suspension 130, a throttle control 132, a shift control 134, an AC control 136, a traction control 138, and/or a stability control 140. In other embodiments, a power control or a differential control may be included and the operations thereof may be adjusted based on the driving mode. Any other systems of the vehicle 102 may be adjusted based on the driving mode, and the systems discussed herein are illustrative and non-limiting.

The suspension 130 is configured to control aspects of the vehicle suspension, such as a suspension sensitivity. The suspension 130 may be an electronically controlled adjustable suspension, which may be able to adjust the tightness of the suspension of the vehicle 102. A tighter suspension may feel more responsive to the driver, but the comfort to the passengers may be reduced. A softer suspension may feel more comfortable to the passengers, but the driver may not feel as high of a level of responsiveness as compared to a tighter suspension.

The throttle control 132 is configured to control aspects of the throttle of the vehicle 102. When the vehicle 102 has an internal combustion engine, the throttle of the vehicle 102 controls an amount of air which is let into the engine, which controls a power and speed of the engine. When the vehicle 102 is an electric vehicle, the throttle may control an amount of electrical power delivered to the motor, from the power source, such as the battery. The throttle control 132 may be adjusted to be more or less sensitive. For example, when the throttle control 132 is adjusted to be more sensitive, an amount of accelerator pedal depression required to drive the vehicle 102 may be reduced. That is, when the throttle control 132 is more sensitive, the driver requires less accelerator pedal depression to propel the vehicle 102, resulting in a more responsive, more rapid possible acceleration of the vehicle 102. Conversely, when the throttle control 132 is less sensitive, the driver requires more accelerator pedal depression to propel the vehicle 102, resulting in a less responsive but more smooth and comfortable ride.

The shift control 134 is configured to control aspects of the gear shifting of the vehicle 102. The vehicle 102 may automatically shift to a higher gear when a particular rotations per minute are reached. The shift control 134 may increase the rotations per minute threshold when in certain driving modes so that the vehicle 102 may be held in a lower gear for a longer time. Holding the vehicle 102 in a lower gear as the vehicle 102 is rapidly accelerating may allow the engine to remain in a higher-power-outputting engine speed. In some situations, the shift control 134 may decrease the required rotations per minute threshold when in certain driving conditions to encourage shifting gears to increase fuel economy.

The AC control 136 is configured to control aspects of an air conditioning or heating unit of the vehicle. The vehicle 102 may use less air conditioning or heating when in a fuel/energy saving driving mode. The vehicle 102 may also use less air conditioning or heating in a high performance mode, and may devote more resources to the air conditioning or heating in a comfort mode.

The traction control 138 is configured to control the traction of the vehicle 102. In particular, the traction control 138 adjusts a rate that one or more of the wheels spin at. When the traction control 138 is engaged, the spinning of the wheels may be slowed down when the wheels spin faster than they should be spinning. Accordingly, the traction control 138 slows down the wheels. When the traction control 138 is disengaged, the wheels may continue to spin despite a detected loss of traction to provide the driver with full control, assuming the driver will be able to handle the situation, or even assuming the driver intended for the loss of traction to occur, such as when the driver performs a sliding turn, commonly referred to as drifting.

The stability control 140 is configured to steer the vehicle 102 in a particular direction when traction is lost during a turn. In some regards, the stability control 140 is a form of traction control, whereby a coordinated series of brake engagements assists in steering the vehicle 102 when traction is lost. When the stability control 140 is fully engaged, the vehicle 102 may automatically steer itself in situations where traction is lost, and when the stability control 140 is reduced in sensitivity, the vehicle 102 may be allowed to slide in order to perform maneuvers, such as drifting.

The display 142 is configured to display the currently active driving mode, and/or which particular settings of the current driving mode are active. The display 142 may be part of an infotainment unit and may also present navigation instructions and may also provide a map of the current location of the vehicle 102 and/or a desired destination. The display 142 may include multiple display screens. For example, the display 142 may be two screens—one for displaying a map, and another for displaying a driving mode or settings of the driving mode.

Figure 3:
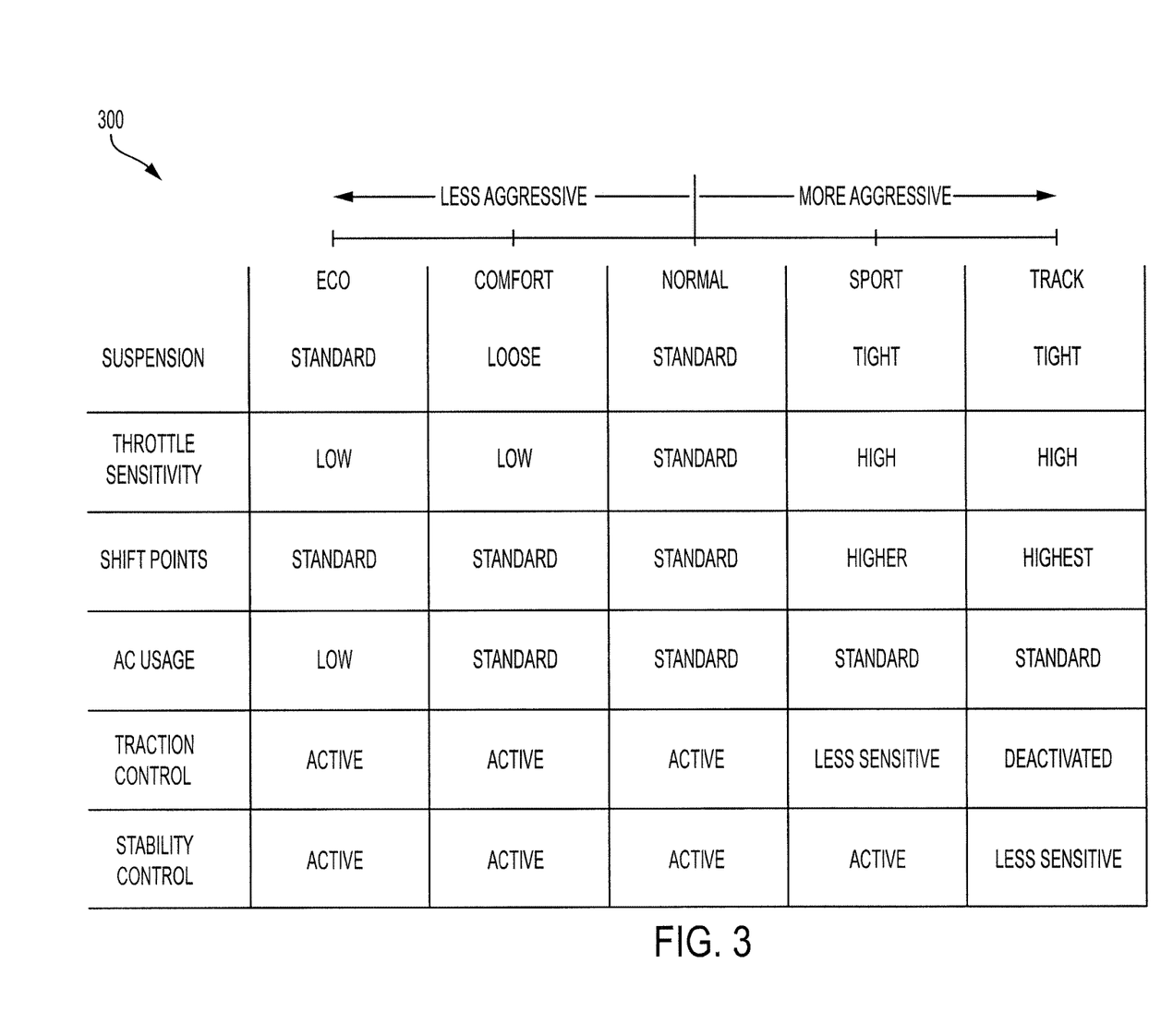
FIG. 3 illustrates a table of various exemplary driving modes and settings, according to various embodiments of the invention.

FIG. 3 illustrates a table of various exemplary driving modes and the settings associated with each one, according to various embodiments of the invention. The table 300 may be stored in the memory 128, and used by the ECU 106 in implementing a particular driving mode.

The various driving modes may be edited or additional driving modes may be added by a user using the input unit 104. In some embodiments, a computing device, such as a laptop or a smartphone may update a table stored on the remote data server 126, and the table 300 stored in the memory 128 may be updated by the remote data server 126 via the transceiver 122. In these embodiments, a confirmation may be displayed to the user via the display 142 so that the user is aware of changes being made to the driving mode table 300.

As shown in table 300, an economy driving mode may have a standard suspension sensitivity setting, a low throttle sensitivity, standard shift points, a low AC usage, an active traction control, and an active stability control. In some embodiments, when the vehicle 102 is a hybrid vehicle, the economy driving mode includes additional use of the battery powered motor, and less use of the engine. The economy driving mode may be suitable for long stretches of driving where the vehicle 102 maintains a relatively consistent speed. The economy driving mode may also be suitable for traffic situations where the vehicle 102 experiences a significant amount of stops.

As shown in table 300, a comfort driving mode, which is on the more aggressive side relative to the economy driving mode, may have a loose suspension, a low throttle sensitivity, standard shift points, a standard AC usage, an active traction control and an active stability control. The comfort driving mode may be suitable for long stretches of driving where the vehicle 102 maintains a relatively consistent speed. The comfort driving mode may also be suitable for uneven terrain in rural or residential areas.

Also as shown in table 300, the normal driving mode, which is on the more aggressive side relative to the comfort driving mode, may have a standard suspension, a standard throttle sensitivity, standard shift points, a standard AC usage, an active traction control, and an active stability control. When features of the road are unclear or when there is significant variance within a small location radius, the standard driving mode may be used.

As shown in table 300, the sport driving mode, which is on the more aggressive side relative to the normal driving mode, may have a tight suspension, a high throttle sensitivity, higher shift points, a standard AC usage, a less sensitive traction control, and an active stability control. The sport driving mode may be suitable for open roads with many curves, or for pronounced inclines and declines.

As shown in table 300, the track driving mode, which is the most aggressive driving mode, has a tight suspension, a high throttle sensitivity, highest shift points, a standard AC usage, a deactivated traction control, and a less sensitive stability control. The track driving mode may be suitable for using at a race track, in a controlled environment.

Figure 4:
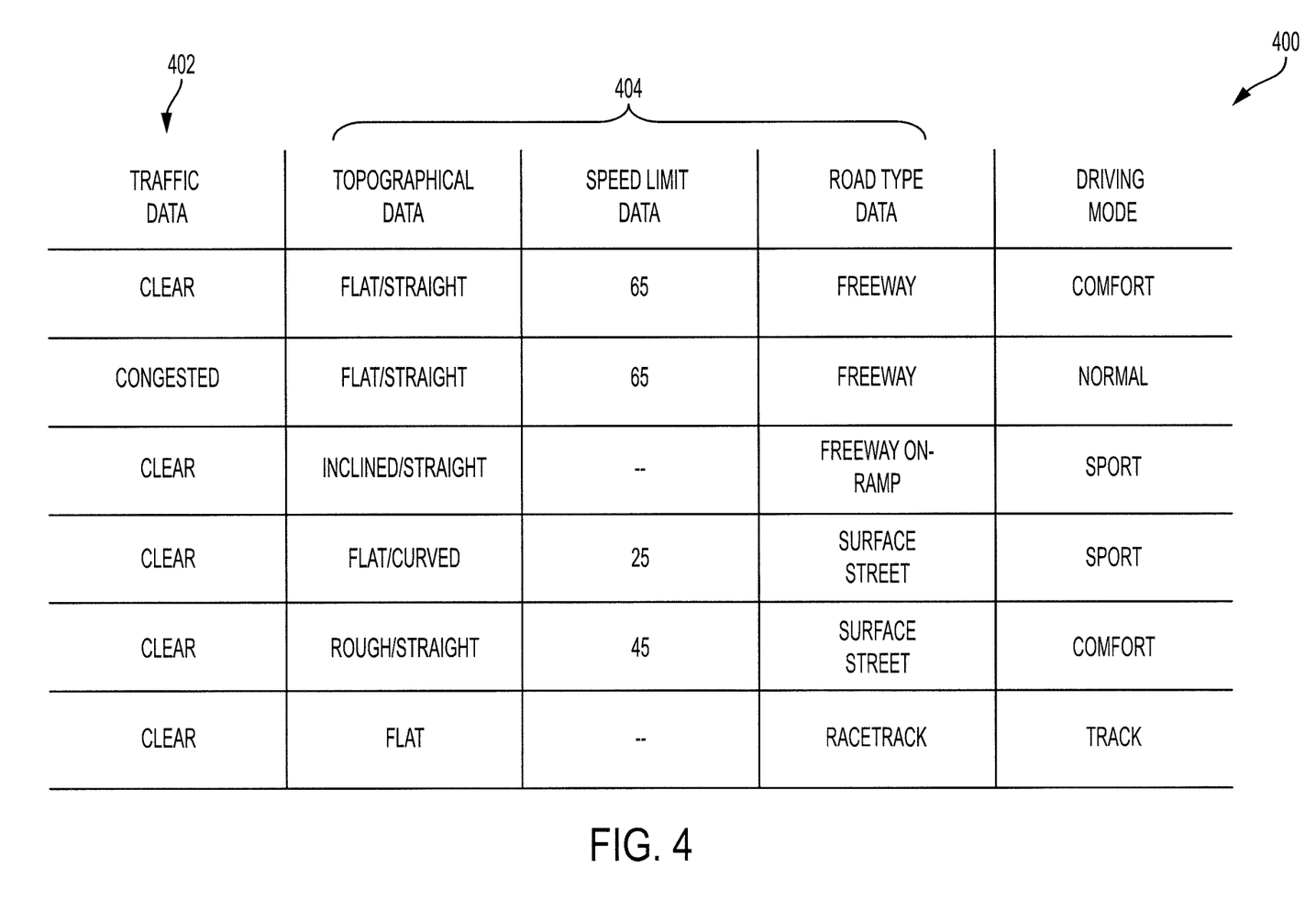
FIG. 4 illustrates a table of various driving conditions and an associated driving mode for each condition, according to various embodiments of the invention.

FIG. 4 illustrates a table 400 of various driving conditions and an associated driving mode for each condition, according to various embodiments of the invention. The table 400 is an exemplary table, and not an exhaustive list of possible conditions and corresponding driving modes.

Table 400 includes traffic data 402 and driving condition data 404 such as topographical data, speed limit data, and road type data, and different values of traffic data and driving condition data may result in a different corresponding driving mode. For example, when the traffic data indicates clear traffic, the topographical data indicates a rough and straight road, the speed limit data indicates a speed limit of 45 miles per hour, and the road type data indicates a surface street, the corresponding driving mode is a comfort driving mode.

The GPS unit 124 may determine a geographic location of the vehicle 102 and the ECU 106 may determine the driving condition data (e.g., topographical data, speed limit data, and the road type data) based on the geographic location of the vehicle 102. Particular geographic locations may be associated with various driving condition data values. For example, the latitude and longitude coordinates of 33.826795, −118.207300 may be associated with driving condition data including topographical data of inclined and curved road, speed limit data of 25 miles per hour, and road type data of freeway merging ramp. The mapping of geographical location to driving condition data may be stored in memory 128 or may be stored in the remote data server 126 and retrieved by the ECU 106 via the transceiver 122. The associated driving condition data is referenced in the table 400 and the ECU 106 determines the corresponding driving mode.

The driving mode determined by the table 400 based on the driving conditions may be an initial driving mode, which is subject to adjustment based on driving aggressiveness preferences of the driver, as described herein.

In some situations, there may be a set of driving condition data and/or traffic data for which there is no corresponding driving mode. In other situations, the traffic data may not be available, or the driving condition data may not be available. In some embodiments, in these situations, the system may maintain a current driving mode. In other embodiments, in these situations, the system may use a default driving mode, such as normal or comfort. The default driving mode may be determined by the user and input to the system via the input unit 104. The default driving mode may be used as the initial driving mode and may be subject to adjustment, as described herein.

The table 400 may be adjusted based on inputs from the driver via input unit 104 or based on trends detected by the ECU 106 based on a driving history of the driver. For example, although a normal driving mode corresponds to driving conditions where the traffic data indicates congestion, the topographical data indicates a flat and straight road, the speed limit data indicates a speed of 65 miles per hour, and the road type data indicates a freeway, the ECU 106 may determine that the driver, via the input unit 104 performs an ad hoc adjustment by manually adjusting the driving mode to comfort. When the driving mode is adjusted to a different driving mode a threshold number of times, the ECU 106 may determine that the driver prefers a different driving mode in those driving conditions, and the ECU 106 may adjust or overwrite the table 400 to reflect the preferences of the driver. In some embodiments, the threshold number of times the driver performs an ad hoc adjustment to the driving mode before the initial driving mode is changed in the table 400 may be as little as one time, or may be any number greater than that.

The table 400 may also be adjusted based on learned behaviors of the driver. The ECU 106 may store a user driving history to keep track of driving habits in particular types of locations, such as freeways or downtown city streets, and the ECU 106 may modify the table 400 accordingly. For example, the driver may frequently make sharp turns in downtown city streets or on the freeway in traffic. The ECU 106 may determine that the driver drives aggressively in these types of locations and accordingly, the table 400 may be modified to reflect the driver's behavior. In this example, any driving conditions with freeways or downtown city streets or heavy traffic may be adjusted so that the associated driving mode is adjusted from normal to sport.

In some embodiments, user driving history indicating the driving habits of the driver of vehicle 102 may be sent to the remote data server 126 via the transceiver 122. The remote data server 126 may aggregate driving habits of various drivers of various vehicles to determine an aggregate driving data. The aggregate driving data may indicate the driving habits of a plurality of drivers at a particular location. The ECU 106 may receive the aggregate driving data from the remote data server 126 and the ECU 106 may determine a driving mode based on the aggregate driving data. For example, if at a particular part of an open road, vehicles slow their speed in response to a patch of rough terrain, the aggregate driving data may indicate the slowdown and the ECU 106 may adjust the driving mode accordingly. In some situations, a less aggressive driving mode than the one currently being used is used in anticipation of the rough patch. In other situations, a particular driving mode, such as a comfort driving mode or an offroad driving mode is used. In some embodiments, data from a suspension system of various vehicles is collected, and the aggregate driving data may further describe the terrain of the rough patch. The table 400 may be adjusted based on the additional terrain information from the aggregate driving data.

Figure 5:
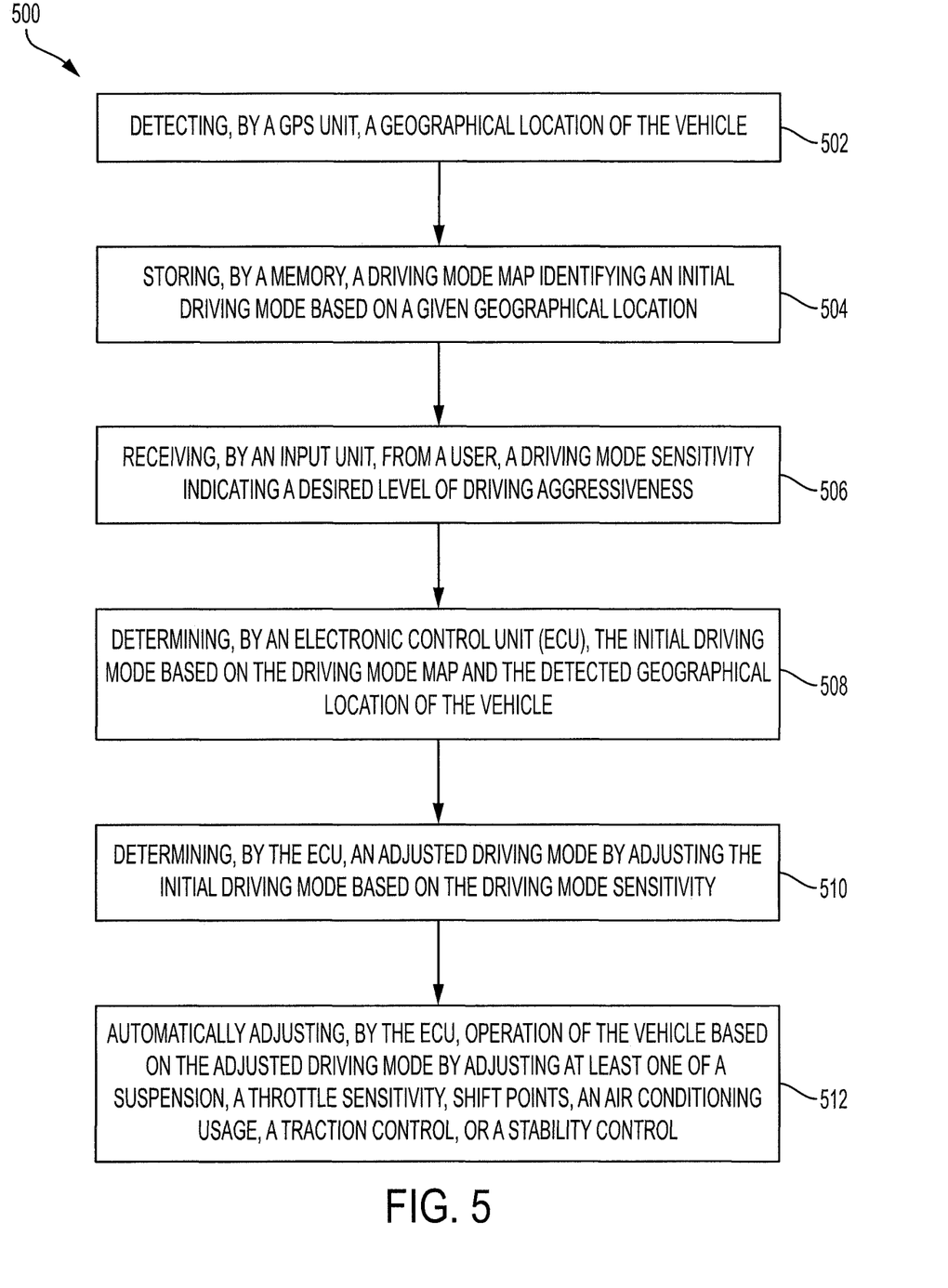
FIG. 5 illustrates a flow diagram of a process performed by the automatic vehicle driving mode system, according to various embodiments of the invention.

FIG. 5 illustrates a flow diagram of a process 500 performed by the automatic vehicle driving mode system, according to various embodiments of the invention.

The GPS unit 124 detects a geographical location of the vehicle 102 (step 502). The geographical location may be represented by a set of latitude and longitude coordinates.

The memory 128 stores a driving mode map identifying an initial driving mode based on a given geographical location (step 504). In some embodiments, the driving mode map is a table of geographical locations and corresponding initial driving modes. For example, the driving mode map may have a geographical location (e.g., 34.134300, −117.835489) and a corresponding initial driving mode (e.g., normal driving mode). In other embodiments, the driving mode map is a table of driving condition data and corresponding initial driving modes, as shown in FIG. 4. In these embodiments, a table may be stored in memory 128 mapping a geographic location (e.g., 34.134300, −117.835489) with corresponding driving condition data (e.g., flat and straight road, 25 miles per hour speed limit, and residential road type). In addition, in these embodiments, a transceiver 122 receives traffic data, and the traffic data may be used to determine the initial driving mode.

An input unit 104 receives, from a user (e.g., the driver or a passenger of the vehicle 102), a driving mode sensitivity indicating a desired level of aggressiveness (step 506). The desired level of aggressiveness may be one of: more aggressive, neutral, or less aggressive. In many embodiments, step 506 may occur before step 504 and the driving mode sensitivity may be stored in memory 128.

The ECU 106 determines the initial driving mode based on the driving mode map and the detected geographical location of the vehicle (step 508). For example, the detected geographical location of the vehicle may be at a location associated with a normal driving mode, as indicated by the driving mode map.

The ECU 106 determines an adjusted driving mode by adjusting the initial driving mode based on the driving mode sensitivity (step 510). The various driving modes of the vehicle 102 may be arranged on a spectrum of aggressiveness from less aggressive to more aggressive. The initial driving mode may be adjusted in a direction according to the driving mode sensitivity. For example, the initial driving mode may be determined as a normal driving mode. When the driving mode sensitivity, as indicated by the driver, is a more aggressive driving mode, the initial driving mode of the normal driving mode may be adjusted to a sport driving mode. When the driving mode sensitivity, as indicated by the driver, is a less aggressive driving mode, the initial driving mode of the normal driving mode may be adjusted to a comfort driving mode. When the driving mode sensitivity, as indicated by the driver, is a neutral driving mode, the initial driving mode of the normal driving mode may be kept as the normal driving mode.

The ECU 106 automatically adjusts the operation of the vehicle based on the adjusted driving mode by adjusting at least one of a suspension, a throttle sensitivity, shift points, an air conditioning usage, a traction control, and/or a stability control (step 512). For example, when the comfort driving mode is detected as the adjusted driving mode, the suspension 130 is set to a loose setting, the throttle control 132 is set to low sensitivity, the shift control 134 is set to standard shift points, the AC control 136 is set to standard usage, the traction control 138 is set to active, and the stability control 140 is set to active.

The adjusted driving mode may be further adjusted based on driving history. This may further tailor the driving mode chosen for the driver based on the particular location. In some embodiments, the driving history may be a driving history of the driver. In some situations, the driver may adjust the driving mode manually after the system automatically determines and implements a particular driving mode. For example, the driver may indicate a less aggressive driving mode preference, but at a particular freeway entrance, the driver may wish to use sport mode. When the driver reaches the particular freeway entrance, the driver may manually switch the automatically determined normal mode or comfort mode into sport mode via the input unit 104. The ECU 106 may store each instance where the driver manually adjusted the driving mode to a particular driving mode, and use the particular manually chosen adjusted mode in the future. The driver's manual driving mode adjustment may be stored in memory 128. The manual driving mode adjustment may be referenced according to geographic location, such as by latitude and longitude coordinates.

In other embodiments, the driving history may be a driving history of all vehicles which have driven at a particular geographic location. For example, if at a particular mountain road, most of the vehicles use a comfort mode, the ECU 106 may automatically use a comfort mode, or may at least move toward the comfort mode (e.g., move the driving mode from sport to normal, toward the less aggressive side of the driving mode spectrum). Each vehicle travelling along the particular mountain road may communicate an identification of driving mode to the remote data server 126 via the transceiver 122. When the percentage of vehicles using a particular driving mode exceeds a threshold, the remote data server 126 may communicate an indication to the ECU 106 via the transceiver 122 to use the particular driving mode.

In some embodiments, the ECU 106 may determine the adjusted driving mode based on an algorithm taking into account one or more of the factors described herein, such as location, type of driving conditions, traffic, driving mode sensitivity, and driving history, for example. The algorithm may weight certain factors more heavily than other factors. For example, the algorithm may take driving conditions and driving history into more consideration than driving mode sensitivity or location. The algorithm's weighting of the various factors may adjust based on further additional factors, such as the time of day, the type of vehicle, or the particular driver currently driving the vehicle. The weighting used by the algorithm executed by the ECU 106 may be customizable by the driver, and the driver may indicate the driver's weighting preferences using the input unit 104.

In an example situation, the GPS location data detected by the GPS unit 124 may indicate that the vehicle 102 is located in a residential area, but the driving history may indicate that the driver has historically driven aggressively in this area, the vehicle operations array 108 may indicate that the driver is currently driving aggressively, and the driving sensitivity may be "aggressive." In this example situation, the ECU 106 may determine that despite the location indicating use of a "comfort" driving mode, a more aggressive driving mode, such as "sport" may be used instead based on the additional other factors indicating preference for a more aggressive driving mode.

After step 512, the process 500 may repeat, with the GPS unit 124 determining a new location of the vehicle 102, such that the driving mode may automatically change without driver input. The timing of when to switch from a first driving mode to a second driving mode may be determined by the ECU 106 based on a direction of travel determined by the GPS unit 124. In some embodiments, the ECU 106 may, at any given location, determine a likelihood of transitioning to a different driving mode, and when the likelihood exceeds a threshold value, the ECU 106 may transition to the different driving mode at a location or time which would be least noticeable to the driver. For example, if the vehicle 102 is driving along an empty freeway, but is travelling in a direction where heavy traffic is approaching ahead of the vehicle 102, the ECU 106 may determine the vehicle is 90% likely going to switch to the economy driving mode as a result of encountering this traffic. The ECU 106 may further determine that the vehicle 102 should switch from the comfort driving mode to the economy driving mode the next time the driver steps off of the accelerator pedal within two miles of the upcoming traffic. In this example, the probability of encountering the traffic may be determined based on the map data, as there may be limited freeway exit points along the route, and/or may be determined based on the vehicle travel history, as the driver may frequently drive on this freeway through the location where there is traffic. By anticipating the switch to the different driving mode, the switch to the different driving mode can be made when the driver may least feel the change in driving modes.

In some embodiments, the ECU 106 determines a route to navigate the driver along in order to reach a destination. In these embodiments, the ECU 106 may determine and anticipate the various driving modes to be used along the route, and the ECU 106 may switch to the next driving mode at an optimal location or time. For example, if the determined route involves travelling along a residential street and onto a freeway on-ramp, the ECU 106 may determine a location or time to switch from a normal driving mode used on the residential street to a sport driving mode used on the freeway on-ramp. In the example, the ECU 106 may determine that a particular intersection with a stop sign close to the freeway on-ramp, on the route along the residential street is an appropriate location to switch from the normal driving mode to the sport driving mode. By making the switch at this intersection instead of right when the vehicle enters the freeway on-ramp, the transition between the driving modes may be less noticeable.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for automatically determining and implementing a driving mode from a plurality of driving modes of a vehicle, the system comprising:
an input unit configured to receive, from a user, a driving mode sensitivity indicating a desired level of driving aggressiveness, the driving mode sensitivity being one of more aggressive, neutral, or less aggressive; and
an electronic control unit (ECU) configured to:
determine an initial driving mode based on a detected geographical location of the vehicle,
determine an adjusted driving mode by adjusting the initial driving mode based on the driving mode sensitivity, the adjusted driving mode being a more aggressive driving mode than the initial driving mode when the driving mode sensitivity is more aggressive, the adjusted driving mode being the same as the initial driving mode when the driving mode sensitivity is neutral, or the adjusted driving mode being a less aggressive driving mode when the driving mode sensitivity is less aggressive, and
automatically adjust operation of the vehicle based on the adjusted driving mode by adjusting at least one of a suspension, a throttle sensitivity, shift points, an air conditioning usage, a traction control, or a stability control.

2. The system of claim 1, further comprising a memory configured to store driving condition data associated with the detected geographical location of the vehicle, including topographical data, speed limit data, and road type data and store a driving mode map used by the ECU to determine the initial driving mode based on the driving condition data associated with the detected geographical location of the vehicle.

3. The system of claim 2, further comprising a transceiver configured to receive traffic data, and
wherein the ECU is further configured to determine the initial driving mode based on the detected geographical location of the vehicle and the traffic data.

4. The system of claim 1, further comprising a memory configured to store a user driving history indicating the user's driving habits at particular geographic locations or types of locations, and
wherein the ECU is further configured to determine the initial driving mode based on the detected geographical location of the vehicle and the user driving history.

5. The system of claim 1, further comprising a transceiver configured to receive aggregate driving data indicating driving habits at particular geographic locations or types of locations for a plurality of users, and
wherein the ECU is further configured to determine the line the initial driving mode based on the detected geographical location of the vehicle and the aggregate driving data.

6. The system of claim 1, further comprising a memory configured to store a driving mode map identifying the initial driving mode based on the detected geographical location,
wherein the input unit is further configured to receive an ad hoc driving mode change to an updated driving mode, and
wherein the memory is further configured to update the driving mode map based on the detected geographical location of the vehicle and the updated driving mode.

7. A vehicle automatically determining and implementing a driving mode from a plurality of driving modes, the vehicle comprising:

a memory configured to store a driving mode map identifying an initial driving mode based on a given geographical location;
an input unit configured to receive, from a user, a driving mode sensitivity indicating a desired level of driving aggressiveness, the driving mode sensitivity being one of more aggressive, neutral, or less aggressive; and
an electronic control unit (ECU) configured to:
determine the initial driving mode based on the driving mode map and a current geographical location,
determine an adjusted driving mode by adjusting the initial driving mode based on the driving mode sensitivity, the adjusted driving mode being a more aggressive driving mode than the initial driving mode when the driving mode sensitivity is more aggressive, the adjusted driving mode being the same as the initial driving mode when the driving mode sensitivity is neutral, or the adjusted driving mode being a less aggressive driving mode when the driving mode sensitivity is less aggressive; and
automatically adjust operation of the vehicle based on the adjusted driving mode by adjusting at least one of a suspension, a throttle sensitivity, shift points, an air conditioning usage, a traction control, or a stability control.

8. The vehicle of claim 7, wherein the memory is further configured to store driving condition data associated with the current geographical location, including topographical data, speed limit data, and road type data, and
wherein the driving mode map identifies the initial driving mode based on the driving condition data associated with the current geographical location.

9. The vehicle of claim 7, further comprising a transceiver configured to receive traffic data, and
wherein the ECU is further configured to determine the initial driving mode based on the driving mode map, the current geographical location, and the traffic data.

10. The vehicle of claim 7, wherein the memory is further configured to store a user driving history indicating the user's driving habits at particular geographic locations or types of locations, and
wherein the ECU is further configured to determine the initial driving mode based on the driving mode map, the current geographical location, and the user driving history.

11. The vehicle of claim 7, further comprising a transceiver configured to receive aggregate driving data indicating driving habits at particular geographic locations or types of locations for a plurality of users, and
wherein the ECU is further configured to determine the initial driving mode based on the driving mode map, the current geographical location, and the aggregate driving data.

12. The vehicle of claim 7, wherein the input unit is further configured to receive an ad hoc driving mode change to an updated driving mode, and
wherein the memory is further configured to update the driving mode map based on the location data of the vehicle and the updated driving mode.

13. A method for automatically determining and implementing a driving mode from a plurality of driving modes of a vehicle, the method comprising:
storing, by a memory, a driving mode map identifying an initial driving mode based on a given geographical location;

determining, by an electronic control unit (ECU), the initial driving mode based on the driving mode map and a detected geographical location of the vehicle;

determining, by the ECU, an adjusted driving mode by adjusting the initial driving mode based on a driving mode sensitivity, the driving mode sensitivity being one of more aggressive, neutral, or less aggressive, and the adjusted driving mode being a more aggressive driving mode than the initial driving mode when the driving mode sensitivity is more aggressive, the adjusted driving mode being the same as the initial driving mode when the driving mode sensitivity is neutral, or the adjusted driving mode being a less aggressive driving mode when the driving mode sensitivity is less aggressive; and automatically adjusting, by the ECU, operation of the vehicle based on the adjusted driving mode by adjusting at least one of a suspension, a throttle sensitivity, shift points, an air conditioning usage, a traction control, or a stability control.

14. The method of claim 13, further comprising storing, by the memory, driving condition data associated with the geographical location of the vehicle, including topographical data, speed limit data, and road type data, and
wherein the driving mode map identifies the initial driving mode based on the driving condition data associated with the geographical location of the vehicle.

15. The method of claim 13, further comprising receiving, by a transceiver, traffic data, and
wherein the ECU determines the initial driving mode based on the driving mode map, the detected geographical location, and the traffic data.

16. The method of claim 13, further comprising storing, by the memory, a user driving history indicating the user's driving habits at particular geographic locations or types of locations, and
determining, by the ECU, the initial driving mode based on the driving mode map, the detected geographical location, and the user driving history.

17. The method of claim 13, further comprising receiving, by an input unit, an ad hoc driving mode change from the adjusted driving mode to an updated driving mode, and
updating, in the memory, the driving mode map based on the detected geographical location of the vehicle and the updated driving mode.

* * * * *